Fig : 1
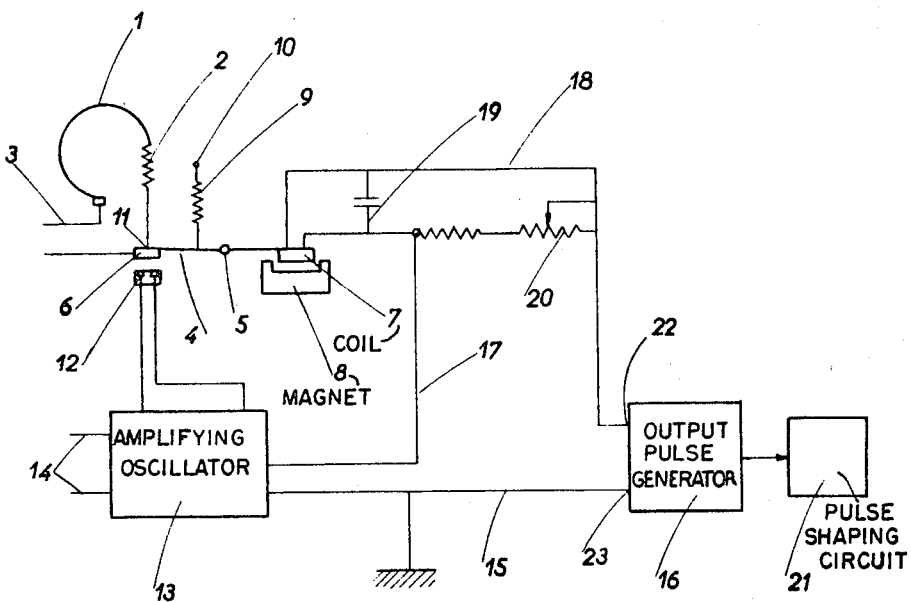
Fig : 2
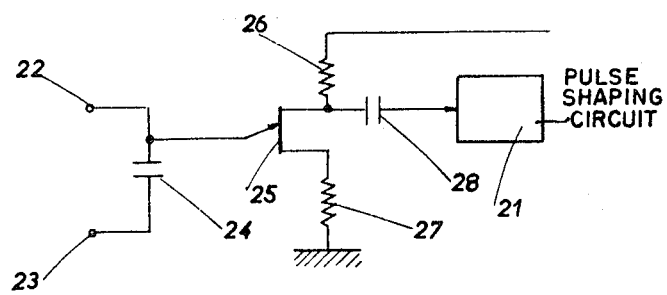

United States Patent Office 3,455,166
Patented July 15, 1969

3,455,166
MEASURING APPARATUS DELIVERING PULSES AT A FREQUENCY PROPORTIONAL TO THE MEASUREMENT
Robert Maurice Gineste, Draveil, France, assignor to Arca Premoncontrole, Paris, France, a company of France
Filed Sept. 12, 1967, Ser. No. 667,160
Claims priority, application France, Sept. 28, 1966, 77,918
Int. Cl. G01l 9/00
U.S. Cl. 73—398                                2 Claims

ABSTRACT OF THE DISCLOSURE

A measuring apparatus delivers pulses at a frequency proportional to the measurement. The apparatus comprises an electro-mechanical force balance connected to a measuring instrument. The feedback circuit of the balance comprises a capacitor connected to the base of a unijunction transistor discharging the capacitor when the voltage applied to the transistor reaches the peak voltage.

---

The subject of the invention is a measuring apparatus for delivering pulses at a frequency proportional to the measurement.

The main object of the invention is to obtain a signal in the form of pulses of constant height at a frequency which is proportional to the measurement. The measurement takes the form of a variable force which may be supplied, for example, by a mechanical or electro-mechanical pickup.

The apparatus includes an electro-magnetic force balance connected to a measuring instrument and, according to the invention, is characterised in that the feedback circuit of the force balance comprises a capacitor connected to the base of a unijunction transistor which will discharge the capacitor when the voltage applied to the transistor reaches the peak voltage.

The invention will now be described in greater detail, with reference to an embodiment given as an example and shown in the drawings.

FIGURE 1 schematically shows a measuring apparatus in accordance with the invention. The pulse generator is shown only diagrammatically and by its position at the output of the measuring apparatus.

FIGURE 2 is a diagram of the pulse generator in accordance with the invention.

The measuring apparatus shown in the drawing consists of a measuring element which, by way of example, consists here of a Bourdon tube 1 associated with a calibrated spring 2. The Bourdon tube is a curved tube subjected to an internal pressure by the pipe 3. Alterations in the pressure of the fluid in the pipe 3 result in alterations in the curvature of the Bourdon tube 1, and the action on the measuring apparatus.

This apparatus includes an electro-mechanical balance consisting of a beam 4 which can oscillate about an axis 5. The beam 4 has a ferrite block 6 at one end and a coil 7, disposed in register with a permanent magnet 8, at the other end.

A mechanical facility is provided for adjusting the zero point of the force balance, consisting of a spring 9 attached to one end of the beam 4; the other end 10 can be displaced and thus control the position of the zero point.

The end of the spring 2 not fixed to the Bourdon tube 1 is fixed to the beam 4 at 11.

The ferrite block 6 moves with respect to a choke coil 12 connected to an amplifying oscillator 13 supplied with current through leads 14.

The measurement is detected by the electro-magnetic balance, which detects variations in the measurement by fluctuations in the inductance acting on the amplifying oscillator 13. This oscillator delivers a variable direct current to circuits consisting of a lead 15 connected to the output pulse generator 16, and a lead 17 connected to the coil 7. This coil is also connected to the pulse generator 16 by a lead 18.

In parallel with the coil 7, there is a pulse-smoothing capacitor 19. The electro-mechanical balance also includes a calibration adjusting device, consisting of a potentiometer 20 in parallel with the circuit 18.

At the output of the pulse generator there is a pulse-shaping circuit 21. The pulse-shaping circuit 21 can also be replaced by a frequency-multiplying unit.

FIGURE 2 schematically represents the pulse generator, starting with its input terminals 22 and 23, which are also represented in FIGURE 1. This pulse generator contains a capacitance 24 which is charged by the output current of the measuring apparatus, and a unijunction transistor with its base 25 connected to the capacitor circuit 24.

One of the electrodes of the unijunction transistor is fed with a voltage through a resistor 26. The other electrode of the unijunction transistor is grounded through another resistor 27. The electrode connected to the resistor 26 is connected to the pulse-shaping circuit 21 by a capacitor 28.

When the apparatus operates, the capacitor 24 is charged, and the discharge of this capacitor is ensured by the firing of the unijunction transistor, which becomes conductive after the peak voltage has been reached. This peak voltage is fixed and depends only on the unit supply voltage. Under these conditions, the duration of the charge in the capacitor 24 is given by the formula $$t = \frac{CV}{I}$$

The frequency of the pulses is given by the formula:

$$F = \frac{1}{t} = \frac{I}{CV}$$

The last expression gives a linear relationship between the frequency of the pulses and the feedback current I. In this formula, V denotes the peak voltage and C the value of the capacitor.

The measuring apparatus which has been described supplies a signal in the form of pulses of constant height supplied by means of the capacitor 24. When the apparatus detects a variation in the measurement, this information is converted, by means of the pulse generator 16 shown in greater detail in FIGURE 2, into a change in the frequency of the pulses. The frequency of the pulses is proportional to the measurement, as shown by the formula above.

The invention, of course, is not limited to the details of the embodiment described above. These can be altered without exceeding the limits of the invention.

I claim:
1. A measuring apparatus for delivering pulses at a frequency proportional to the measurement, comprising an electro-mechanical force balance including a feedback circuit having a displacement pick-up connected to a displacement type output mechanism of a measuring instrument, the feed-back circuit of the force balance comprising a pulse generator having an output and including a capacitor connected to the base of a unijunction transistor which will discharge the capacitor when the voltage applied to the transistor reaches a predetermined peak voltage whereby the frequency of the pulses at said outlet is indicative of a displacement of the measuring instrument.

2. A measuring apparatus as set forth in claim 1, the feedback circuit comprising an amplifying oscillator controlled by said pick-up which includes a choke coil.

References Cited

UNITED STATES PATENTS 2,949,775    8/1960    Newbold    73—398 XR
3,045,489    7/1962    Brandt    73—398 XR LOUIS R. PRINCE, Primary Examiner DONALD O. WOODIEL, Assistant Examiner U.S. Cl. X.R.

73—362